D. W. McNEIL.
APPARATUS FOR MOLDING CLAY OR SIMILAR MATERIAL.
APPLICATION FILED FEB. 9, 1910.
1,142,341.
Patented June 8, 1915.
2 SHEETS—SHEET 2.
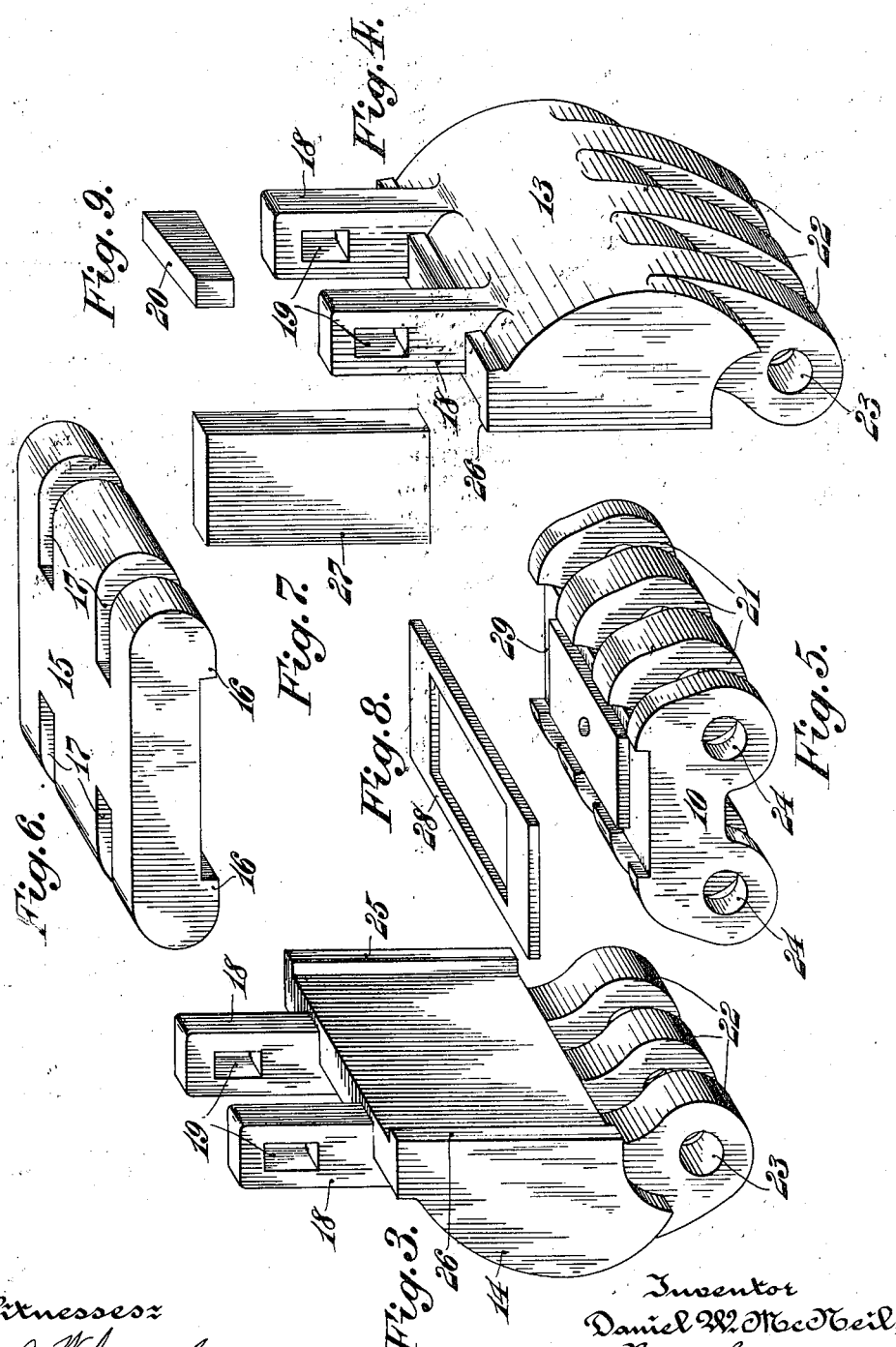

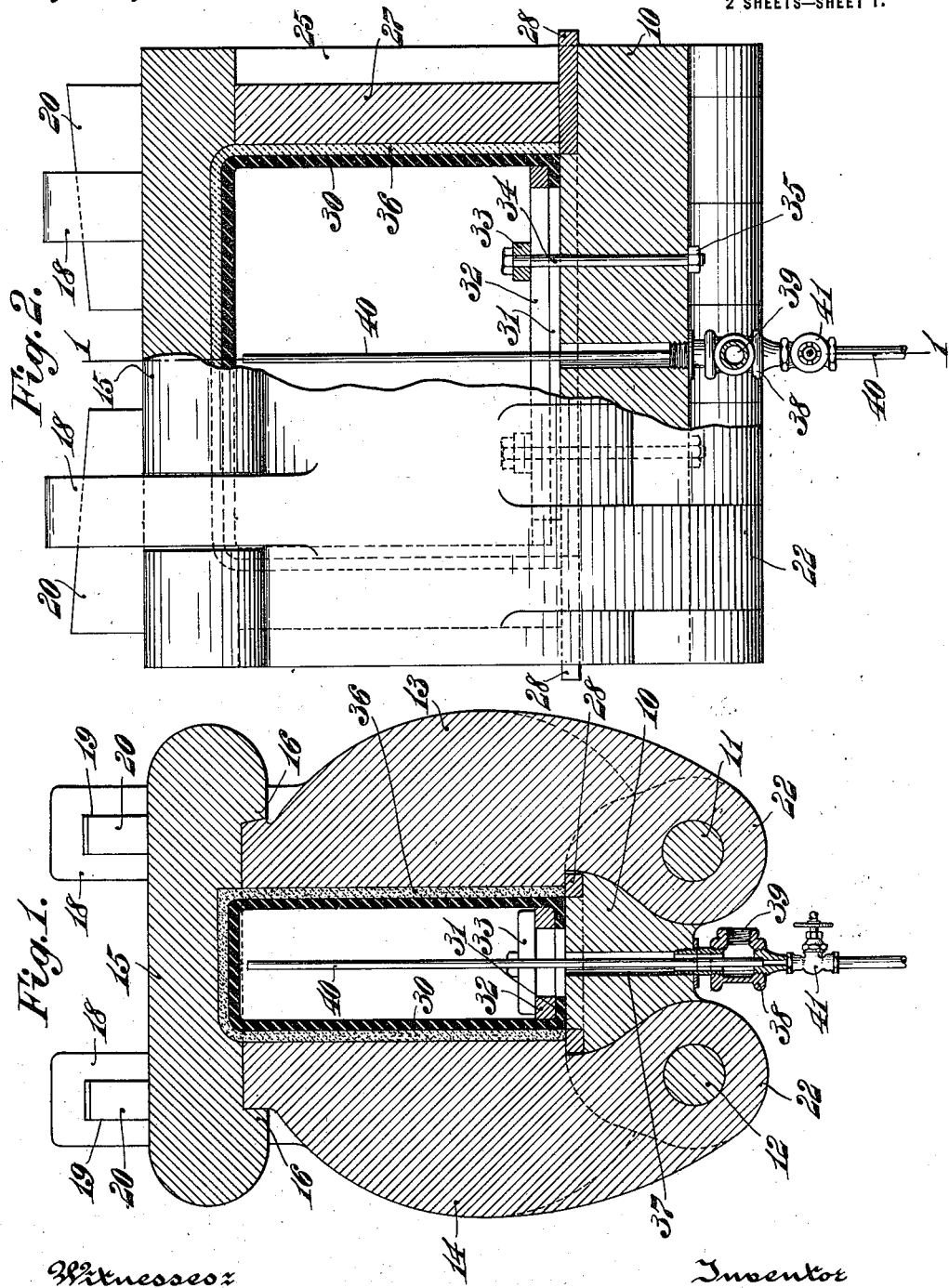
D. W. McNEIL.
APPARATUS FOR MOLDING CLAY OR SIMILAR MATERIAL.
APPLICATION FILED FEB. 9, 1910.
1,142,341. Patented June 8, 1915.
2 SHEETS—SHEET 1.

UNITED STATES PATENT OFFICE.

DANIEL W. McNEIL, OF EAST NORWOOD, OHIO, ASSIGNOR TO THE JOHN DOUGLAS COMPANY, A CORPORATION OF OHIO.

APPARATUS FOR MOLDING CLAY OR SIMILAR MATERIAL.

1,142,341.  Specification of Letters Patent.  Patented June 8, 1915.

Application filed February 9, 1910. Serial No. 542,826.

*To all whom it may concern:*

Be it known that I, DANIEL W. McNEIL, a citizen of the United States, residing at East Norwood, in the county of Hamilton, State of Ohio, have invented a new and useful Apparatus for Molding Clay or Similar Material, of which the following is a specification.

My invention relates to improvements in apparatus for molding clay or similar material, and is especially adapted to the manufacture of hollow ware.

The method forms the subject matter of another application filed by me September 13, 1910, and numbered 581,842.

The object of the invention is to provide quick means for forming said material in a mold, means whereby the same may be readily and quickly removed from the mold, and means whereby the material forming the article molded shall contain as little moisture as possible so that the same will dry in a very short time compared with the wet process now in general use.

My invention comprises an improved core or chum for the mold, which shall primarily coöperate in confining the material in the mold and against the sides thereof, in approximately the form in which it is to be compressed. This improved core or chum is then expanded to compress the material against the surrounding mold into its final shape.

Referring to the drawings, Figure 1 is a vertical section on line 1—1 of Fig. 2. Fig. 2 is a side elevation with part in section. Fig. 3 is a perspective view of one of the movable sides of the mold. Fig. 4 is a perspective view of the other movable side. Fig. 5 is a similar view of the bottom element of the mold. Fig. 6 is a similar view of a top element. Fig. 7 is a similar view of an end element. Fig. 8 is a perspective view of a supporting frame. Fig. 9 is a perspective view of a wedge.

Similar numerals refer to similar parts throughout the several views.

I have shown my invention in the accompanying drawings as applied to an apparatus for molding a tank of clay material, such as earthenware or vitreous china.

Fig. 1 indicates the several parts in assembled operative relationship.

10 is the base of the mold, to which are pivotally secured or hinged by the pivot pins 11 and 12 the side elements 13 and 14. The top element 15 is recessed, as clearly shown in Figs. 1 and 6, to coöperate in locking in operative position, the side elements 13 and 14. Element 15 is provided with the shoulders 16 for engaging the upper ends of elements 13 and 14 to prevent their opening outwardly. Element 15 is also provided with the recesses 17 adapted to engage the arms 18 of said side members 13 and 14. Arms 18 are provided with apertures 19 for receiving the wedges 20, which lock the elements 13, 14 and 15 securely together. The bottom element 10 is also provided with recesses 21 for receiving the fingers 22 of elements 13 and 14. The fingers 22 of members 13 and 14 are provided with the apertures 23, and the member 10 is provided with the registering apertures 24 for receiving the pivot pins 11 and 12.

The side members 13 and 14 are provided with the shoulders 25 and 26 for engaging the end pieces 27 for holding same in position.

The frame 28 is adapted to fit in the recess 29 of bottom member 10. This frame 28 provides means for supporting and removing the molded article 36, when the same has been compressed.

The expansible chum or core 30 is made of heavy rubber or other similar material, having walls of such thickness and consistency as to make the same self-supporting, that is, able to retain its shape under normal conditions, and consequently nearly rigid and also to enable it to support the weight of clay or similar material to be used in forming the articles 36. This chum 30 is provided with a horizontal inwardly extending rim or lip 31, adapted to rest upon the top of base 10. Upon this rim 31 rests the frame 32 which is clamped down by the yokes 33 and bolts 34. By tightening the nut 35, the frame 32 is pressed firmly against the rim or lip 31 of chum 30 holding the same securely to the base, and preventing any leak of fluid or air between the chum and the base member 10.

The base 10 is provided with the vertically extending channel 37, adapted to open into the mouth of the chum 30. The lower portion of the channel is connected with the T 38 which is provided with the threaded opening 39 for connection with a suitable pump or compressor not shown. The pipe 40 extends from near the top of the chum through channel 37 downwardly, and is open at the top and is controlled near its lower extension by the cock 41.

It will be understood that the inner walls of the mold correspond to the outer surface of the article to be formed thereby. The chum or core is of corresponding shape, but of less dimensions; that is, when normal, it is of sufficiently less dimensions to provide just space enough between it and the mold to receive the required amount of clay or similar material to form the article to be molded.

The operation of my device is as follows: The mold is placed in the position shown in Fig. 1, with the exception that the cap or top element 15 is removed. The space between the core or chum 30, and the sides and ends 13, 14 and 27 of the mold, is filled with loose material. This material, which is in the form of a nearly dry powder, is practically poured into the mold about the core, and the top of the core or chum 30 is also covered with a sufficient thickness of said material. The cap or top 15 is then put into place as shown in Fig. 1, and locked firmly in said position by the wedges 20. Fluid or compressed air is then made to enter through T 38, and pass through the channel 37 to the interior of core or chum 30, causing the said core or chum to expand and press the surrounding material against the inside walls of the mold. It will be understood that the material, while in the loose unconfined state, resembles an almost dry powder, but when the same is put under considerable pressure, as by the expanding of the core in the mold, a sufficient proportion of moisture will be contained in the mass to cause the mass to maintain the shape in which it has been compressed. The amount of such moisture required to maintain the mass in its compressed shape is comparatively extremely small, so that the compressed article is almost dry enough for the kiln as soon as it comes out of the mold. This is obviously a great improvement in the method of molding clay articles now in common use, in which the clay is placed in the mold in a wet or plastic state. That is to say, when the material is formed by hand upon the core, a great deal of moisture is required to hold the clay in place while the mold is being assembled; and after such clay has been pressed, the moisture is so great that it requires a great deal of time for the piece of work to dry, while, as above stated, by my process the article is almost dry enough to be placed in the kiln immediately as it comes out of the mold.

If liquid is used in expanding the core or chum, the cock 41 is opened to permit the escape, through pipe 40, of air displaced by the liquid. As soon as the water, for example, is seen to escape through pipe 40, the cock 41 is closed.

As soon as sufficient pressure is exerted upon the material in the mold, by expanding the rubber chum, the fluid is permitted to escape from the core, through T 38. This permits the chum to assume its original dimension. The cap or top 15 is then removed, the sides 14 and 13 are opened up, and the ends 27 are also removed. The rectangular frame 28 may now be lifted to carry and remove the compressed article 36 from over the core or chum 30, after which the operation is repeated.

It will be understood that my invention is not to be confined to the specific embodiment above described as a preferred form or as an example. My claims are intended to include all reasonable equivalents, and are not to be construed to have limitations not absolutely necessary or else specifically recited.

What I claim is:—

1. Means for receiving and pressing powdered or loose clay or similar material, in the production of hollow ware receptacles having a side or sides and a covered end, comprising a mold, a somewhat expansible self supporting chum within the mold normally of corresponding and almost the same but lesser contour, whereby a space is provided between chum and mold for the introduction of the powdered material and means for expanding the chum.

2. Means for receiving and pressing powdered or loose clay or similar material, in the production of hollow ware receptacles having a side or sides and a covered end, comprising a mold, a self supporting expansible chum within the mold normally of corresponding and almost the same but lesser contour, whereby a space is provided between chum and mold for the introduction of the powdered material, and means for expanding the chum and compacting the powdered material.

3. Means for receiving and pressing powdered or loose clay or similar material in the production of hollow ware receptacles having a side or sides and a covered end, comprising a mold, an elastic nearly rigid chum within the mold, normally of corresponding and almost the same contour to the inside of the object but of lesser dimensions, and means for expanding the chum.

4. Means for receiving and pressing powdered or loose clay or similar material in the production of hollow ware receptacles having a side or sides and a closed end, comprising a mold having separable elements and means for locking the same into operative relationship, an elastic self supporting chum within the mold, normally of corresponding and almost the same contour to the inside of the object but of lesser dimensions, and means for expanding the chum.

5. Means for receiving and pressing powdered or loose clay or similar material in the production of hollow ware receptacles having a side or sides and a closed end, comprising a mold having a base and relatively movable side elements adapted to be locked into coöperative relationship, an elastic self supporting chum within the mold, normally of corresponding and almost the same contour but of lesser dimensions, and means for expanding the chum and thereby compacting the powdered material against the sides of the outer mold.

6. The combination of a mold, comprising a base, side elements having intermeshing fingers pivotally connected with the base, end elements adapted to be engaged and held in place by the said side elements, a cap or top element adapted to have interlocking engagement with the side elements, and wedges or cotters for maintaining said interlocking relationship, an elastic substantially rigid chum of a contour corresponding to but smaller than the contour of the mold interior having walls of sufficient thickness and stability normally to maintain its shape, and means for expanding the chum.

7. The combination of a mold, comprising a base, side elements having intermeshing fingers pivotally connected with the base, end elements adapted to be engaged and held in place by the said side elements, a cap or top element adapted to have interlocking engagement with the side elements, and wedges or cotters for maintaining said interlocking relationship, an elastic substantially rigid chum of a contour corresponding to but smaller than the contour of the mold interior having walls of sufficient thickness and stability normally to maintain a required contour, means for clamping said chum to the base of the mold and means for expanding the chum.

DANIEL W. McNEIL.

Witnesses:
L. BEDSEN,
MAE HOFMANN.